(12) United States Patent
Chen et al.

(10) Patent No.: US 9,539,666 B2
(45) Date of Patent: Jan. 10, 2017

(54) TRANSITION JOINT AND METHOD FOR ATTACHING DISSIMILAR METAL TUBES

(75) Inventors: Yen-Lung Chen, Troy, MI (US); Xiaohong Q. Gayden, West Bloomfield, MI (US); Steven J. Wesoloski, Rochester Hills, MI (US); Matthew D. Scrase, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3085 days.

(21) Appl. No.: 11/475,750

(22) Filed: Jun. 27, 2006

(65) Prior Publication Data
US 2007/0295784 A1 Dec. 27, 2007

(51) Int. Cl.
*B23K 20/12* (2006.01)
*B23K 20/227* (2006.01)
*B62D 23/00* (2006.01)
*B62D 29/00* (2006.01)

(52) U.S. Cl.
CPC .......... *B23K 20/12* (2013.01); *B23K 20/2275* (2013.01); *B62D 23/005* (2013.01); *B62D 29/00* (2013.01); *B23K 2201/006* (2013.01); *B23K 2203/20* (2013.01)

(58) Field of Classification Search
None
See application file for complete search history.

(56) References Cited

U.S. PATENT DOCUMENTS

| 3,460,235 | A | | 8/1969 | Roberts et al. |
| 3,693,238 | A | | 9/1972 | Hoch et al. |
| 4,193,529 | A | | 3/1980 | Dick et al. |
| 4,735,355 | A | * | 4/1988 | Browning ..................... 228/189 |
| 5,720,092 | A | * | 2/1998 | Ni et al. ....................... 29/421.1 |
| 6,076,725 | A | * | 6/2000 | Imamura et al. ............. 228/164 |
| 6,364,779 | B1 | | 4/2002 | Duddy |
| 6,452,139 | B1 | | 9/2002 | Benoit et al. |
| 2004/0074884 | A1 | * | 4/2004 | Butler et al. ................ 219/130.4 |
| 2004/0197134 | A1 | * | 10/2004 | Wang et al. .................. 403/234 |
| 2005/0244776 | A1 | | 11/2005 | Abels et al. |

OTHER PUBLICATIONS

Oichi, et al, Friction Welding of Aluminum Alloy and Steel, International Journal of Offshore and Polar Engineering, vol. 8, No. 2, Jun. 1998.

* cited by examiner

Primary Examiner — Brian Jennison

(57) ABSTRACT

A method is provided for welding together a tubular member of a first metal and a tubular member of a second metal that is dissimilar to the first metal. The method includes making a transition attachment by friction welding together end-to-end a first end of a rod of the first metal with a first end of a rod of the second metal. An arc weld welds together a second end of the rod of the first metal with the tubular member of the first metal. And another arc weld welds together a second end of the rod of the second metal to the tubular member of the second metal.

20 Claims, 3 Drawing Sheets

TRANSITION JOINT AND METHOD FOR ATTACHING DISSIMILAR METAL TUBES

FIELD OF THE INVENTION

The present invention relates to attaching together dissimilar metals, such as the attachment of a steel tubular automobile roll cage to a tubular aluminum frame rail.

BACKGROUND OF THE INVENTION

It is known in the manufacture of automobile bodies to assemble together a large number of components that are manufactured of various dissimilar metals. For example, the longitudinal extending tubular frame rails of the vehicle may be made of aluminum in the interest of weight savings. Other components such as a tubular roll cage may be made of steel.

The attachment together of such components of dissimilar metals must meet stringent industry standards for corrosion resistance and strength, and accordingly, it would be desirable to provide new and improved methods for attachment of dissimilar metal components in a manner to provide both high strength and corrosion resistance.

SUMMARY OF THE INVENTION

A method is provided for welding together a tubular member of a first metal and a tubular member of a second metal that is dissimilar to the first metal. The method includes making a transition attachment by friction welding together end-to-end a first end of a rod of the first metal with a first end of a rod of the second metal. An arc weld welds together a second end of the rod of the first metal with the tubular member of the first metal. And another arc weld welds together a second end of the rod of the second metal to the tubular member of the second metal.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
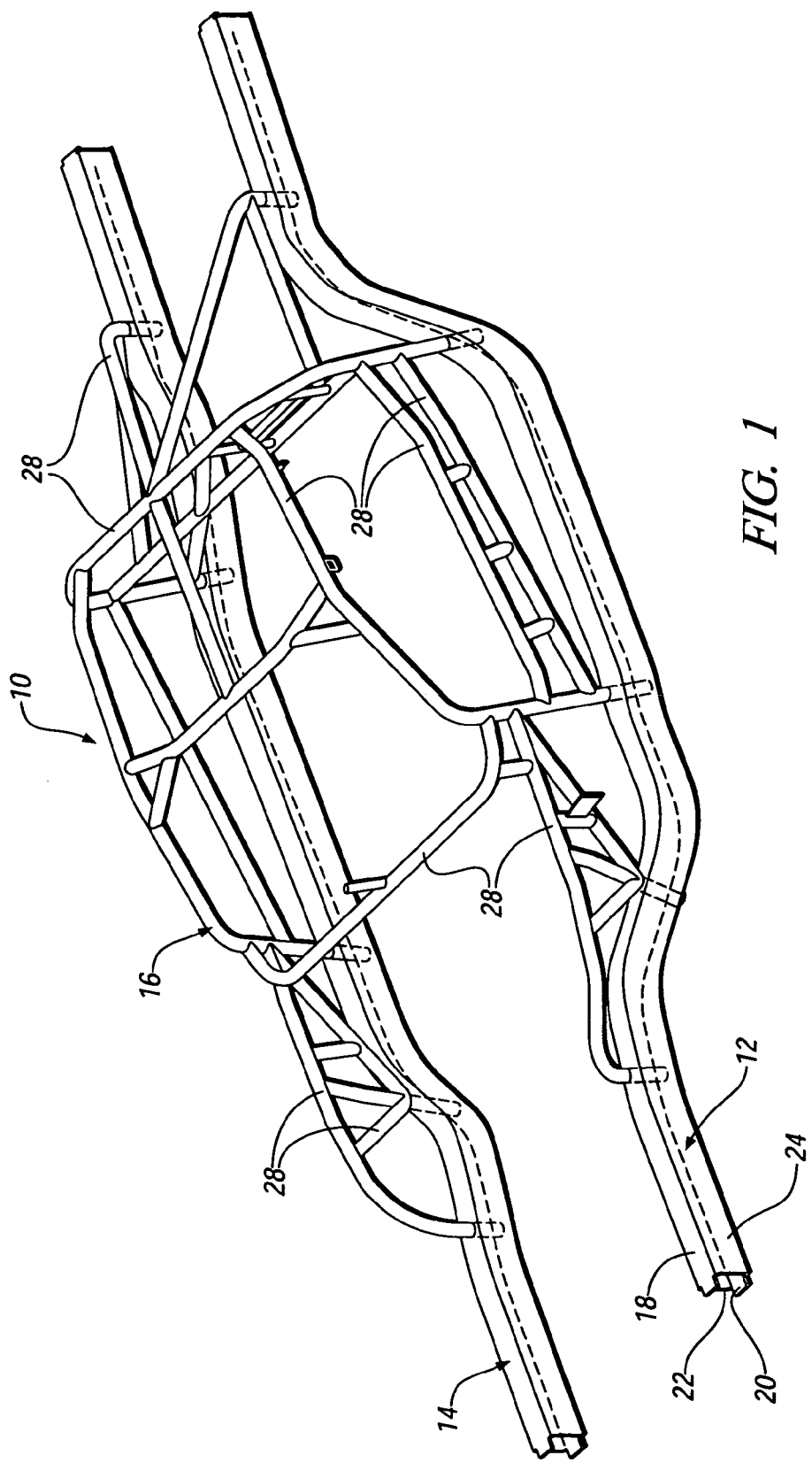
FIG. 1 is a perspective view of an automotive vehicle structure including a roll cage manufactured of hollow steel tubes and a frame manufactured of hollow aluminum tube.

FIG. 1 shows a vehicle structure 10 including a pair of aluminum frame rails 12 and 14 that are connected together by other frame components, not shown. The frame rail 12, as seen in FIG. 2, is a hollow tubular member including top wall 18, bottom wall 20, left side wall 22 and right side wall 24.

FIG. 1 also shows a roll cage 16 that is constructed of welded together steel tubes 28 to provide a high strength and relatively light weight load bearing structure upon which various body panels of metal or plastic will be installed.

Figure 2:
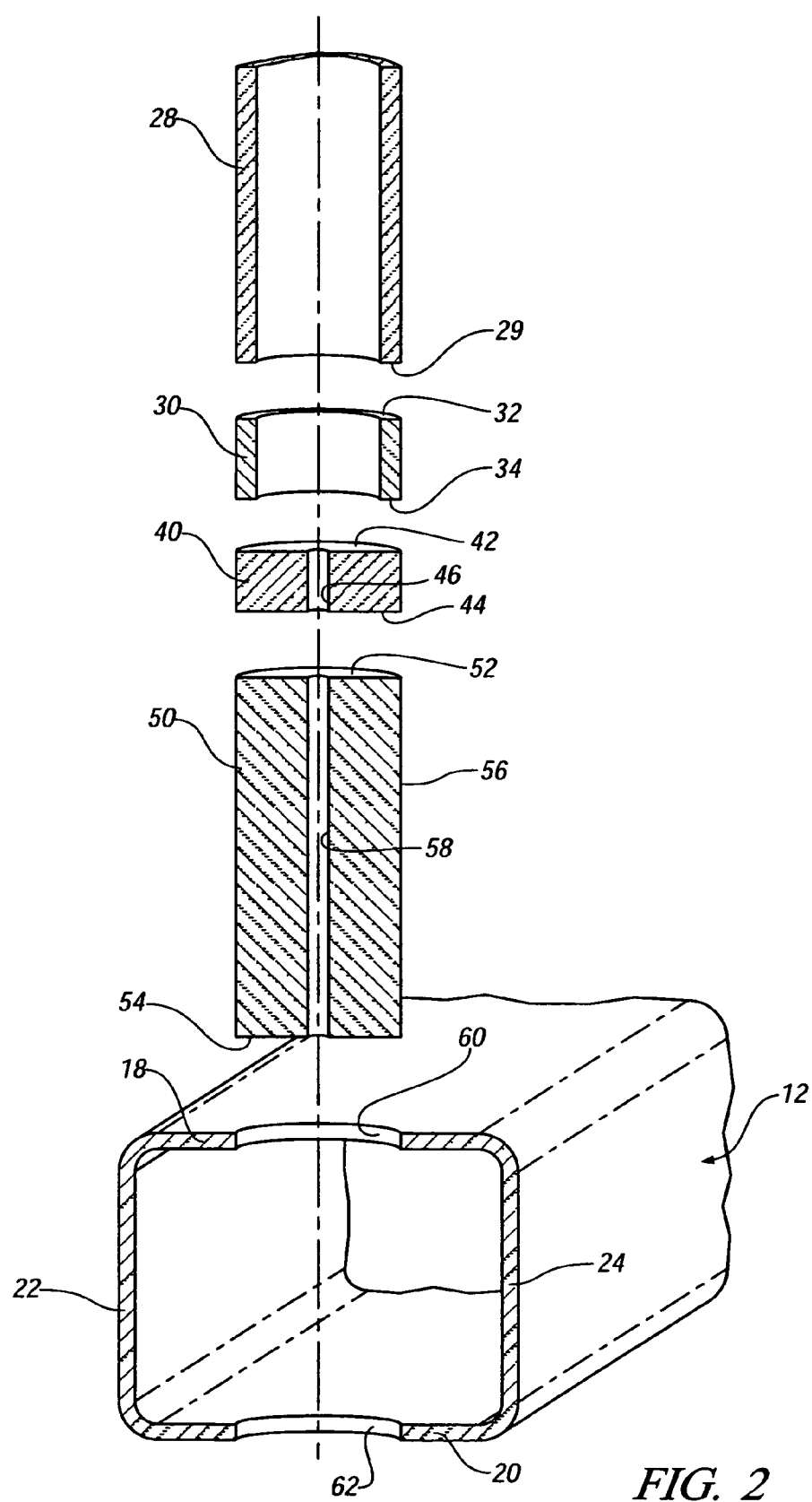
FIG. 2 is an exploded view of various components for making a transition joint for attaching together the hollow steel tubular roll cage and the hollow tubular aluminum frame.

Referring to FIG. 2, it is seen that various components comprising a transition joint for attaching together one of the steel roll cage tubes 28 to the aluminum frame rail 12 includes a steel tube 30, a steel rod 40, and an aluminum rod 50. The steel tube 30 has an upper end 32 and a lower end 34 and is made of a suitable steel alloy such as 4130 steel. The steel rod 40 has an upper end 42 and a lower end 44. The steel rod 40 is of a suitable steel alloy such as 1018 steel and has a central passage 46 drilled though its length. The aluminum rod 50 has an upper end 52, a lower end 54 and an outer surface 56. A cooling passage 58 is provided through the length of the aluminum rod 50. The frame 12 is of suitable aluminum alloy such as 6063-T7 aluminum, and may be of rectangular, round, or other cross-section.

Figure 3:
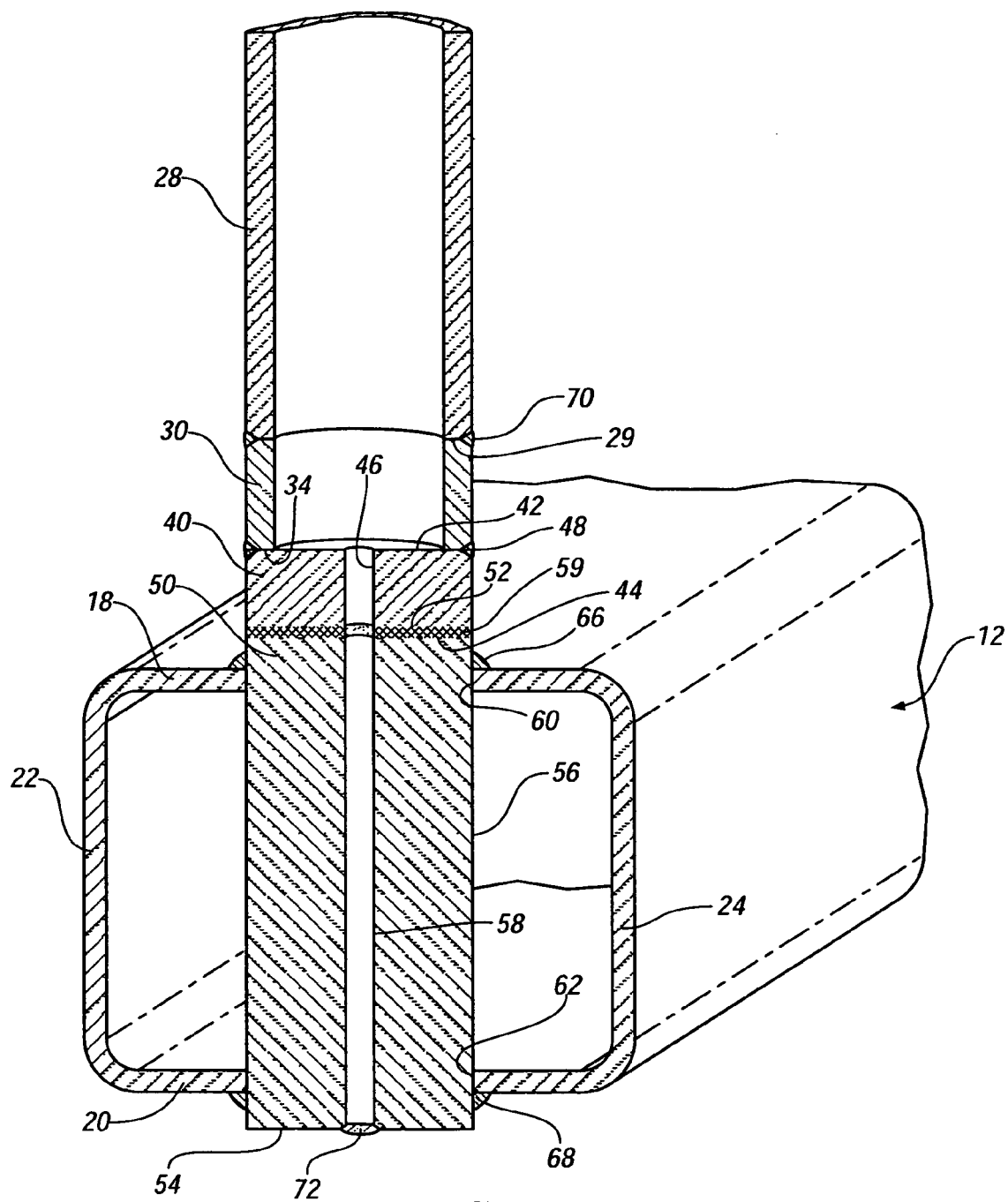
FIG. 3 shows the various components of FIG. 2 welded together to attach the hollow steel tubular roll cage to the hollow tubular aluminum frame.

FIG. 3 shows the various components of the transition joint welded together in their final assembled condition, which is obtained by the assembly method described hereafter.

As a first step, the lower end 34 of steel tube 30 and the upper end 42 of the steel rod 40 are welded together forming a weld 48 there between. A suitable weld 48 is an arc weld such as formed by a gas tungsten arc welding (GTAW) process or a gas metal arc welding (GMAW) process, although other types of weld can be used.

As a next step, the lower end 44 of the steel rod 40 is welded to the upper end 52 of the aluminum rod 50 via friction welding, forming a friction weld 59. In friction welding one of the rods is held stationary, while the other rod is locked in a chuck and rotated at high speed while being advanced toward engagement with the stationary rod. The friction heating of the adjoining faces of the steel rod 40 and the aluminum rod 50 raises the interfacial temperature of the dissimilar steel and aluminum metals and the heated materials in the faying surface region are plastically displaced. Forging pressure is then applied to the work pieces to complete the joining process. Upon cooling, a high strength weld 59 between the rods 40 and 50 is formed.

Thereafter the transition joint assembly, comprised of the welded together steel tube 30, steel rod 40 and aluminum rod 50 is welded to the aluminum frame rail 12 and the steel roll cage 28. In particular, the aluminum rod 50 is inserted through aligned holes 60 and 62 that are provided in the upper wall 18 and lower wall 20 of the aluminum frame rail 12. An arc weld 66 is then applied between the top wall 18 of the aluminum frame rail 12 and the outer surface 56 of the aluminum rod 50, and an arc weld 68 is applied between the bottom wall 20 of the aluminum frame rail 12 and the outer surface 56 of the aluminum rod 50. Although FIG. 3 shows the aluminum rod 50 as extending some distance from the lower wall 20 of the aluminum frame rail 12, it will be understood that the end of the aluminum rod is not required to extend therefrom in order to make an effective weld 68.

As a next step, a lower end 29 of the steel roll cage tube 28 is welded to the upper end 32 of the steel tube 30, forming a weld 70 there between. The weld 70 is preferably a gas tungsten arc weld or gas metal arc weld.

During the making of the welds 66 and 68 between the aluminum rod 50 and the rail 12, water or another coolant is circulated through the passages 58 and 46, to carry away heat that might build up and adversely affect the previously formed friction weld 59 between the steel rod 40 and the aluminum rod 50. During the making of the weld 70 between the steel tube 30 and the steel roll cage 28, a cooling device such as a water jacket (not shown) can be wrapped around the steel tube 30 and steel rod 40 to carry away excess welding heat. Alternatively, passage 46 can be a non-through hole stopping near end 42 of the steel rod 40. Cooling water is circulated through a small copper tube (not shown) inserted into the passages 58 and 46 and the space in between the copper tube and the wall of passages 58 and 46 to carry away excess heat during the making of the welds 66, 68 and 70. This cooling method is a well known practice in the resistance spot welding industry for cooling welding electrodes. The coolant passage 58 is preferably closed with a weld 72 or other suitable plug.

Thus, as seen in FIG. 3, a transition joint is effectively provided for making an attachment between the steel tubular roll cage 16 and the aluminum frame rails 12 and 14, it being understood that similar transition joints are formed at each point of attachment of the roll cage 16 and the frame rails 12 and 14 as seen in FIG. 1.

The foregoing description of the invention is merely exemplary in nature and, thus, variations thereof are intended to be within the scope of the invention. For example, although the two dissimilar metals that are attached together in the foregoing embodiment of the invention are steel and aluminum, the method of this invention can be employed in attaching together many other dissimilar metals, such as steel to magnesium and aluminum to magnesium. In addition, although the foregoing description is directed to the application of the invention to the manufacture of an automotive vehicle body and frame, the method of this invention is not limited to use in automobile manufacture and may be employed in the manufacture of other articles as well.

It is desirable that the steel rod 40 and the aluminum rod 50 are nearly solid cylinders with only a small coolant passage therethrough so the ends 44 and 52 present large contacting surfaces so that the friction welding of the steel and aluminum occurs over a large cross section and provides a strong and reliable weld 59. In addition, the nearly solid cylindrical shape of the steel 40 and the aluminum rod 50 provide a substantial mass of material to act as a heat sink during the formation of the arc welds 66, 68 and 70, so that the friction weld 59 is not overheated in a way that might be adverse to the friction weld 59.

In some applications it may be desirable to omit the steel tube 30 from the transition joint by simply making the steel rod 40 of greater length, it being understood that in applying the invention the user will size the various rods and tube and coolant passage, and choose among the available metal alloys, to achieve the desired attachment of dissimilar metal components in a manner to provide both high strength and corrosion resistance.

For improved corrosion resistance a transition joint may be coated with ELPO and paint. The coating will be removed near the end of the tube and the rod where arc welding is to be done to facilitate the arc welding operation. After the arc welding is completed, the welds will be cleaned and re-coated with appropriate materials for corrosion protection.

What is claimed is:

1. A method for welding together a steel tubular cage and an aluminum frame, comprising:

welding together end-to-end a hollow steel tube and a steel rod;

friction welding together end-to-end the steel rod and an aluminum rod;

welding the aluminum rod to the aluminum frame;

and welding an end of the steel tubular cage to the hollow steel tube.

2. The method of claim 1 in which the welds other than the friction welds are arc welds.

3. The method of claim 2 in which at least one of the welds other than the friction weld is a gas-tungsten arc weld (GTAW).

4. The method of claim 2 in which at least one of the welds other than the friction weld is a gas-metal arc weld (GMAW).

5. The method of claim 2 in which a coolant passage extends through the hollow steel tube, the steel rod, and the aluminum rod so that coolant can be circulated during the arc welding.

6. The method of claim 5 in which the cooling passage in the aluminum rod is plugged subsequent to the arc welding.

7. The method of claim 1 in which the steel tube is 4130 steel alloy and the steel rod is 1018 steel alloy.

8. The method of claim 1 in which the aluminum frame is a hollow tube and holes are provided in opposing walls of the hollow tube to permit the aluminum rod to be inserted through the holes and then welded to each of the opposing walls.

9. A method for welding together a tubular member of a first metal and a tubular member of a second metal that is dissimilar to the first metal, comprising:

making a transition attachment by friction welding together end-to-end a first end of a rod of the first metal with a first end of a rod of the second metal;

arc welding together a second end of the rod of the first metal with the tubular member of the first metal;

and arc welding together a second end of the rod of the second metal to the tubular member of the second metal.

10. The method of claim 9 in which one of the tubular members has opposed walls, aligned holes are provided in the opposed walls, and the second end of the rod of the similar member is inserted through the aligned holes and arc welded to the opposed wall.

11. The method of claim 9 in which coolant passages are provided in the rods and coolant is circulated therethrough during the arc welding.

12. The method of claim 11 further including the plugging of the coolant passages after the arc welding.

13. The method of claim 9 in which one of the first and second metals is steel and the other of the first and second metals is aluminum.

14. The method of claim 9 in which one of the first and second metals is steel and the other of the first and second metals is magnesium.

15. The method of claim 9 in which one of the first and second metals is magnesium and the other of the first and second metals is aluminum.

16. A method for welding a steel tubular cage to the opposed walls of an aluminum tube, comprising:

friction welding together end-to-end a steel rod and an aluminum rod;

providing aligned holes in the opposed walls of the aluminum tube, inserting the aluminum rod through the aligned holes and then arc welding the aluminum rod to the opposed walls of the aluminum tube;

and arc welding an end of the steel tubular cage to the steel rod.

17. The method of claim 16 in which coolant passages are provided in the steel rod and the aluminum rod and coolant is circulated therethrough during the arc welding.

18. The method of claim 17 further including the plugging of the coolant passages after the arc welding.

19. The method of claim 16 in which steel tube is welded end-to end to the steel rod prior to the friction welding of the steel rod and the aluminum rod, and the steel tube is then subsequently arc welded to the steel tubular roll cage.

20. A transition joint assembly for welding together a tubular member of a first metal and a tubular member of a second metal that is dissimilar to the first metal, comprising:
   a rod of the first metal having a first end and also having a second end adapted for arc welding to the tubular member of the first metal;
   and a rod of the second metal having a first end that is friction welded to the first end of the rod of the first metal, and also having a second end adapted for arc welding to the tubular member of the second metal.

\* \* \* \* \*